United States Patent
Onjo

(10) Patent No.: US 8,140,616 B2
(45) Date of Patent: Mar. 20, 2012

(54) SERVER UNIT, SERVER CONTROL METHOD, AND RECORDING MEDIUM IN SERVER-BASED COMPUTING SYSTEM

(75) Inventor: Hiroyuki Onjo, Akishima (JP)

(73) Assignee: Casio Computer Co., Ltd, Tokyo (JP)

( * ) Notice: Subject to any disclaimer, the term of this patent is extended or adjusted under 35 U.S.C. 154(b) by 308 days.

(21) Appl. No.: 12/490,708

(22) Filed: Jun. 24, 2009

(65) Prior Publication Data

US 2010/0030850 A1 Feb. 4, 2010

(30) Foreign Application Priority Data

Jul. 31, 2008 (JP) ................................ 2008-197626

(51) Int. Cl.
*G06F 15/16* (2006.01)
(52) U.S. Cl. ........................................ 709/203; 203/200
(58) Field of Classification Search .................. 709/200, 709/203, 217
See application file for complete search history.

(56) References Cited

U.S. PATENT DOCUMENTS

| | | | | |
|---|---|---|---|---|
| 2006/0184614 A1* | 8/2006 | Baratto et al. | ................. | 709/203 |
| 2006/0210177 A1 | 9/2006 | Murai et al. | | |
| 2006/0222246 A1* | 10/2006 | Murai et al. | ................. | 382/232 |
| 2007/0140726 A1* | 6/2007 | Miyamura | ....................... | 399/94 |

FOREIGN PATENT DOCUMENTS

| | | |
|---|---|---|
| JP | 2003-323402 | 11/2003 |
| JP | 2006-246153 | 9/2006 |
| JP | 2007-272770 | 10/2007 |
| JP | 2008-033407 | 2/2008 |

OTHER PUBLICATIONS

Albert Lai, Limits of Wide-Area Thin-Client Computing, Jun. 15-19, 2002, ACM Sigmetrics 2002, pp. 1-12.*
European Search Report for 09163534.2 Mailed May 18, 2010.
Lai et al.; Limits of Wide-Area Thin-Client Computing, Performance Evaluation Review ACM USA, Jun. 2002, vol. 30, No. 1, pp. 228-239.
Yang et al.; The Performance of Remote Display Mechanisms for Thin-Client Computing, Proceedings of the General Track. 2002 Usenix Annual Technical Conference Usenix Assoc Berkely, CA, USA, Jun. 2002, pp. 131-146.
Japanese Office Action for 2008-197626 mailed on Jun. 29, 2010.

* cited by examiner

*Primary Examiner* — Ario Etienne
*Assistant Examiner* — El Hadji Sall
(74) *Attorney, Agent, or Firm* — Turocy & Watson, LLP

(57) ABSTRACT

When a drawing command for the screen drawing data created by an application program corresponding to a user input event is transmitted to a client unit, if the transmission delay time t obtained by RTT measurement is within a preset threshold value TH, the drawing command is transmitted in real time in an Instantaneous (Eager) Update mode in the order in which the drawing data was created. If the transmission delay time t has exceeded the threshold value TH, an interval corresponding to a drawing update time interval Tn is allowed and the drawing commands during the interval are put together and transmitted in a Non-instantaneous (Lazy) Update mode. In the Non-instantaneous (Lazy) Update mode, transmission priority according to the type of a drawing command (the user's attention) is set.

5 Claims, 10 Drawing Sheets

FIG.6

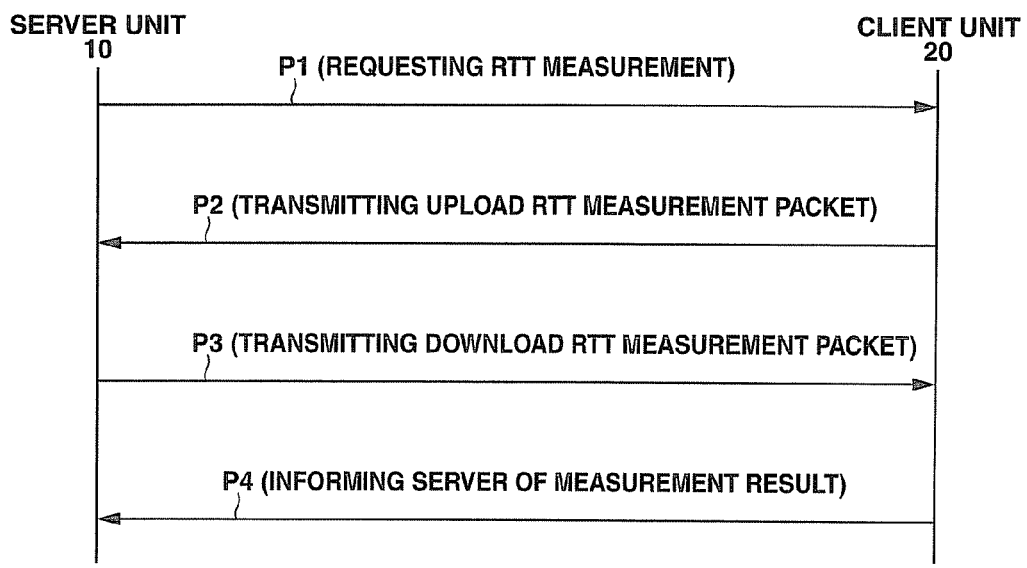

FIG.7

RTT MEASUREMENT REQUEST FORMAT

| ITEM | DATA LENGTH | DATA |
|---|---|---|
| Request RTT Measurement COMMAND NUMBER | 2 | 0x00C0 |
| DATA SIZE | 2 | 10 |
| RTT MEASUREMENT NUMBER | 2 | RTT MEASUREMENT NUMBER |
| NUMBER OF DIVISIONS IN UPLOAD TRANSMISSION | 2 | NUMBER OF DIVISIONS IN UPLOAD TRANSMISSION |
| NUMBER OF DIVISIONS IN DOWNLOAD TRANSMISSION | 2 | NUMBER OF DIVISIONS IN DOWNLOAD TRANSMISSION |
| NUMBER OF DATA ITEMS (IN BYTES) TRANSMITTED FOR UPLOAD MEASUREMENT | 2 | NUMBER OF DATA ITEMS TRANSMITTED AT A TIME |
| NUMBER OF DATA ITEMS (IN BYTES) TRANSMITTED FOR DOWNLOAD MEASUREMENT | 2 | NUMBER OF DATA ITEMS TRANSMITTED AT A TIME |

FIG.10

14d UPDATE INTERVAL TABLE

| UPDATE INTERVAL (ms) | UPDATE INTERVAL NUMBER (Tn) |
|---|---|
| 30ms | 0 (DEFAULT VALUE) |
| 5ms | 1 (VALUE IMMEDIATELY AFTER INPUT EVENT) |
| 15ms | 2 |
| 20ms | 3 |
| 25ms | 4 |

FIG.11

14f COMMAND PRIORITY TABLE

| COMMAND TYPE | PRIORITY FLAG |
|---|---|
| Image | 2 (Normal FIFO) |
| SFILL | 1 (Priority FIFO) |
| Cursor | 0 (Real-Time FIFO) |
| PFILL | 2 (Normal FIFO) |
| Font | 1 (Priority FIFO) |

SERVER UNIT, SERVER CONTROL METHOD, AND RECORDING MEDIUM IN SERVER-BASED COMPUTING SYSTEM

CROSS-REFERENCE TO RELATED APPLICATIONS

This application is based upon and claims the benefit of priority from prior Japanese Patent Application No. 2008-197626, filed Jul. 31, 2008, the entire contents of which are incorporated herein by reference.

BACKGROUND OF THE INVENTION

1. Field of the Invention

This invention relates to a server unit, a server control method, and a recording medium which are for transmitting screen drawing data created at a server unit to a client unit to cause the client unit to display the data in a server-based computing (SBC) system.

2. Description of the Related Art

In a client-server system, there is a server-based computing (SBC) system which causes a desired application program to be started and run on the server unit by, for example, a remote operation on a client unit.

With the SBC system, screen drawing data for client display created by an application program of the server unit according to the operation input from the client unit is transmitted from the server unit to the client unit and displayed on the client unit each time the drawing is updated.

The SBC system has been designed on the assumption of a high-speed network without delay, such as an in-company local area network (LAN). However, if the amount of screen update data is large or the communication speed (bandwidth) of the network is low (narrow), it takes time for screen drawing data created by the server unit according to the operation input from the client unit to be transmitted to the client and displayed completely as one screen, which causes a poor response problem.

To improve the user's apparent response on the client unit, a screen transfer apparatus has been considered which transmits low-image-quality screen drawing data whose data amount is small and, after an interval, further transmits high-image-quality screen drawing data (e.g., refer to Jpn. Pat. Appln. KOKAI Publication No. 2006-246153).

Furthermore, in an environment where transmission delay is liable to occur because, for example, a wireless wide-area network (WAN) is used, there arises a problem: the response to the operation input from the client unit is impaired.

BRIEF SUMMARY OF THE INVENTION

An object of the invention is to provide a server unit, a server control method, and a recording medium in a server-based computing (SBC) system which are capable of suppressing the deterioration of apparent responsiveness at the client unit even in an environment where transmission delay is liable to occur on a network.

According to an aspect of the invention, there is provided a server unit which creates drawing data according to an application program corresponding to an input event from a client unit via a network and transmits the drawing data to the client unit to cause the client unit to display the data in a server-based computing system, the server unit comprising: a transmission delay measuring module which measures a transmission delay time in the network; a first drawing instruction transmission module which, when the transmission delay time in the network measured by the transmission delay measuring module is small, transmits a drawing instruction for the drawing data in real time to the client unit in the order in which the drawing data was created; and a second drawing instruction transmission module which, when the transmission delay time in the network measured by the transmission delay measuring module is large, sets a drawing update interval that is short at the beginning and becomes longer gradually and transmits a drawing instruction for the created drawing data to the client unit in the order of the transmission priority of the drawing instruction in accordance with the set update interval.

According to another aspect of the invention, there is provided a recording medium in which a program for causing a computer to realize the main functions of the server unit of the invention has been recorded.

With the server unit of the invention, it is possible to suppress the deterioration of apparent responsiveness on the client unit in an environment where a transmission delay is liable to occur in a network.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 shows the sequence of an RTT measurement process by an RTT measuring module 13a1 of the server unit 10;

FIG. 7 shows a format of an RTT measurement request transmitted to the client unit 10 as a result of an RTT measurement process by server unit 20;

FIG. 10 is an update interval table for setting a drawing update time interval in multiple stages in the Non-instantaneous (Lazy) Update mode at the server unit 10;

FIG. 11 is a command priority table for setting an order of priority on a drawing command in the Non-instantaneous (Lazy) Update mode at the server unit 10;

DETAILED DESCRIPTION OF THE INVENTION

Hereinafter, referring to the accompanying drawings, an embodiment of the invention will be explained.

Figure 1:
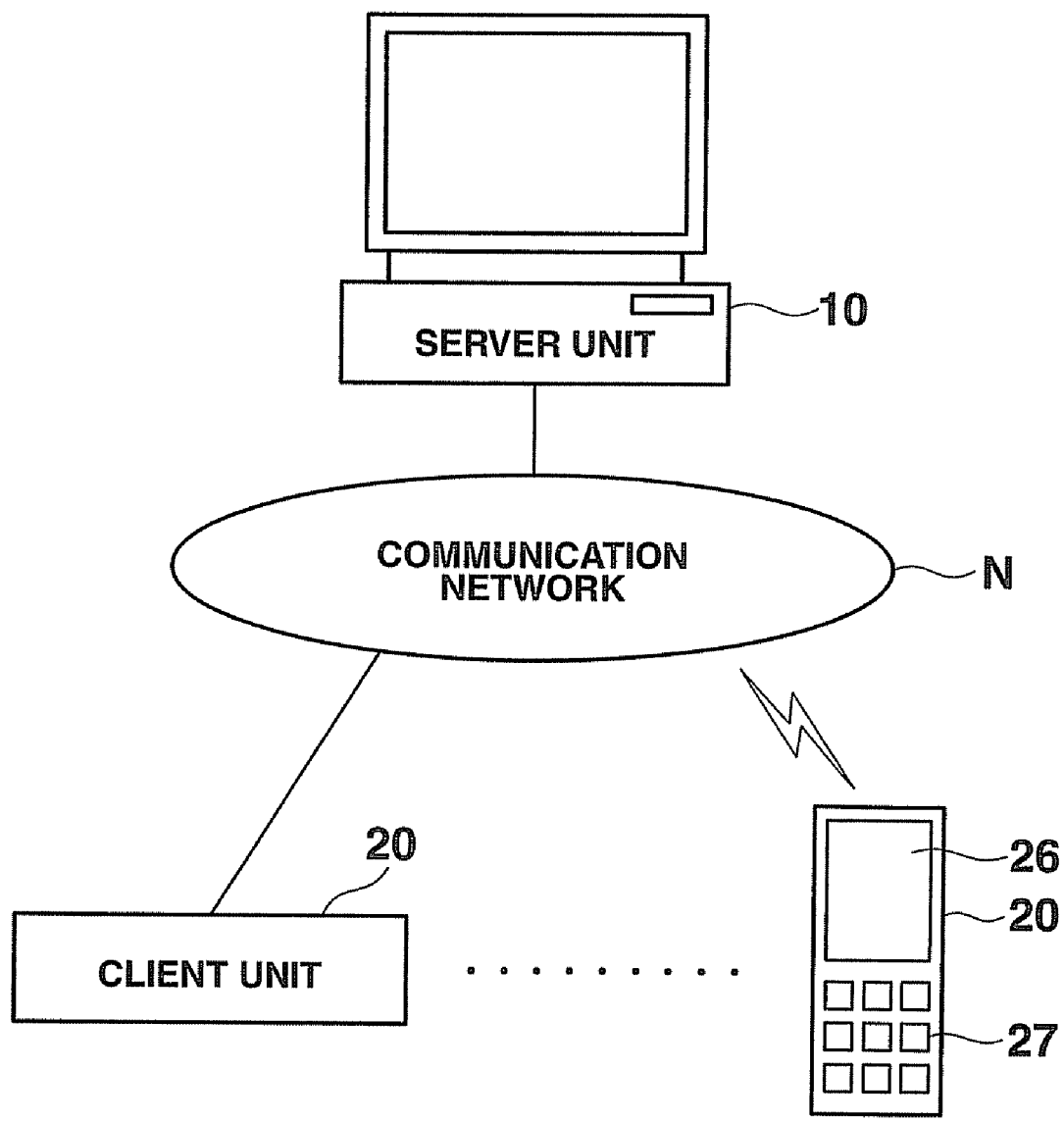
FIG. 1 is a block diagram showing the configuration of a server-based computing (SBC) system according to an embodiment of the invention.

FIG. 1 is a block diagram showing the configuration of a server-Based computing (SBC) system according to an embodiment of the invention.

The SBC system comprises a server unit 10 and a plurality of client units (thin clients) 20 which are connected to a network N composed of wired or wireless local-area networks (LANs) and wide-area networks (WANs).

The server unit 10 has various application programs, including a text creation program, a Web browser program, a spreadsheet program, and a mail handling program. The server unit 10 activates an application program in response to an operation input (or an input event) signal from a client unit 20 connected to the server unit 10 and executes the processing.

In the server unit 10, the drawing data G for display output created on a client frame buffer RAM 14a (see FIG. 2) as a result of the execution of the application program corresponding to the operation input signal from the client unit 20 is transferred to the accessing client unit 20 by a combination of image transmission and command transmission.

Then, the client unit 20 develops the drawing data G transferred from the server unit 10 on a frame buffer RAM 25 (see FIG. 3), thereby displaying the developed data on a display unit 26.

Specifically, each of the client units (thin clients) 20 in the SBC system has not only an input function dealing with the user operations on a keyboard or mouse but also an output function for an LCD display unit and a printer as its main functions. However, each of the client units 20 has none of the various application functions and data file management functions which the server unit 10 has.

Then, the data files created as a result of various types of processing performed at the server unit 10 in response to the operation input (input event) signal from the client unit 20 are basically stored in a storage unit, such as a magnetic disk, in the server unit 10 or connected to and managed by the server unit 10 on a user account basis or in the form of common files.

Figure 2:
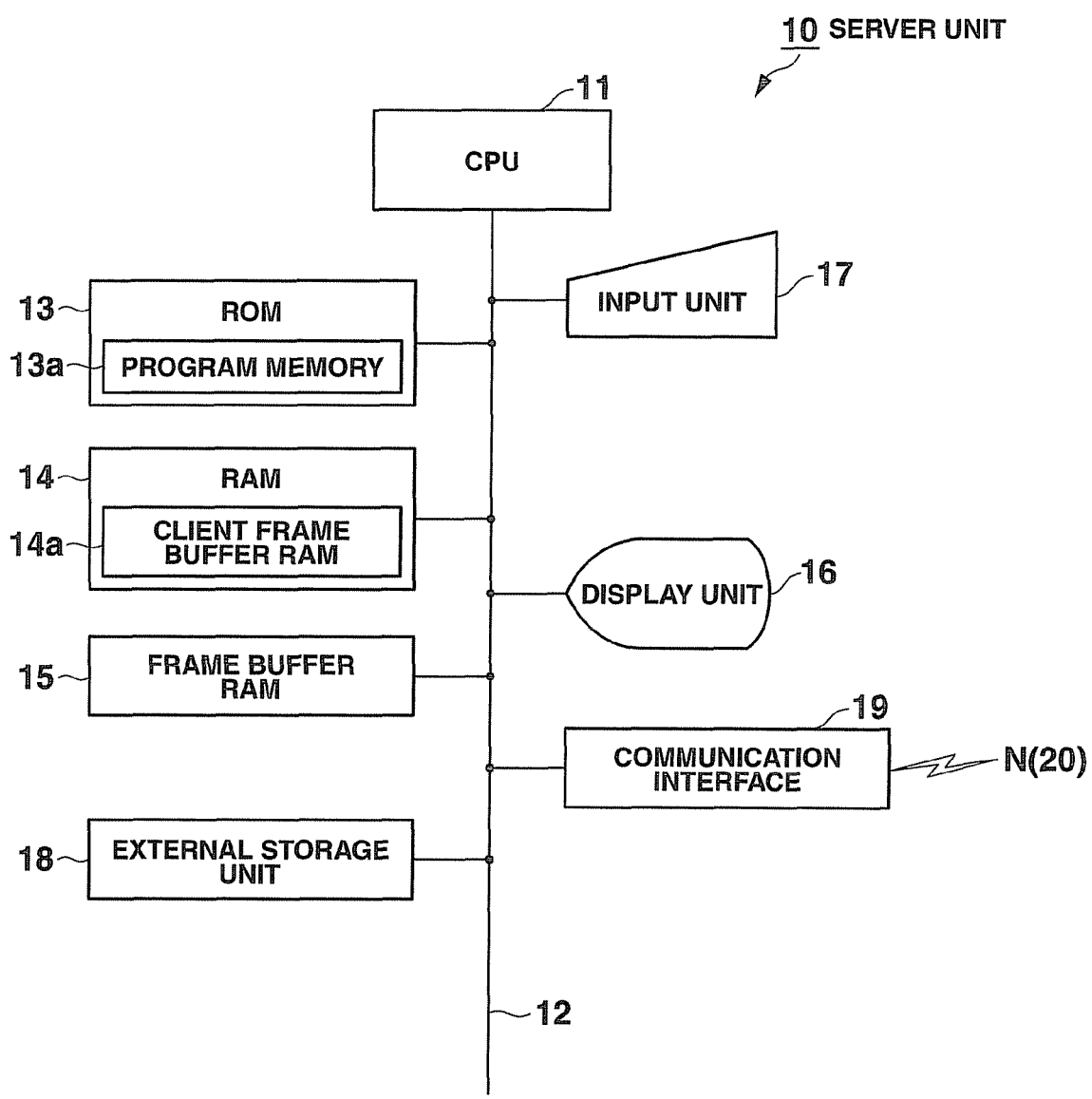
FIG. 2 is a block diagram showing a circuit configuration of a server unit 10 in the SBC system.

FIG. 2 is a block diagram showing a circuit configuration of the server unit 10 in the SBC system.

The server unit 10 includes a CPU 11 serving as a computer. A ROM 13, a RAM 14, a frame buffer RAM 15, and a display unit 16 are connected via a bus 12 to the CPU 11.

Furthermore, an input unit 17, such as a keyboard or a mouse, an external storage unit 18, and a communication interface 19 for communicating with the client units 20 are connected via the bus 12 to the CPU 11.

The CPU 11 controls the operation of each part of the circuit using the RAM 14 as a working memory according to a system program and various application programs prestored in a program memory 13a of the ROM 13. In response to, for example, a key input signal from the input unit 17 or a process instruction (input event) signal corresponding to the user operation from the client unit 20 received via the communication interface 19, the CPU 11 activates and executes the various programs.

In the server unit 10, various items of data created according to the application program executed in response to the input event signal from the client unit 20 are stored into the external storage unit 18 in such a manner that the items of data are caused to correspond to, for example, the user ID. Moreover, client display drawing data G is created using the client frame buffer 14a in the RAM 14. Then the drawing data G is transferred from the communication interface 19 to the client unit 20, which displays the data.

The drawing data to be displayed on the display unit 16 of the server unit 10 is created on the frame buffer RAM 15.

Figure 3:
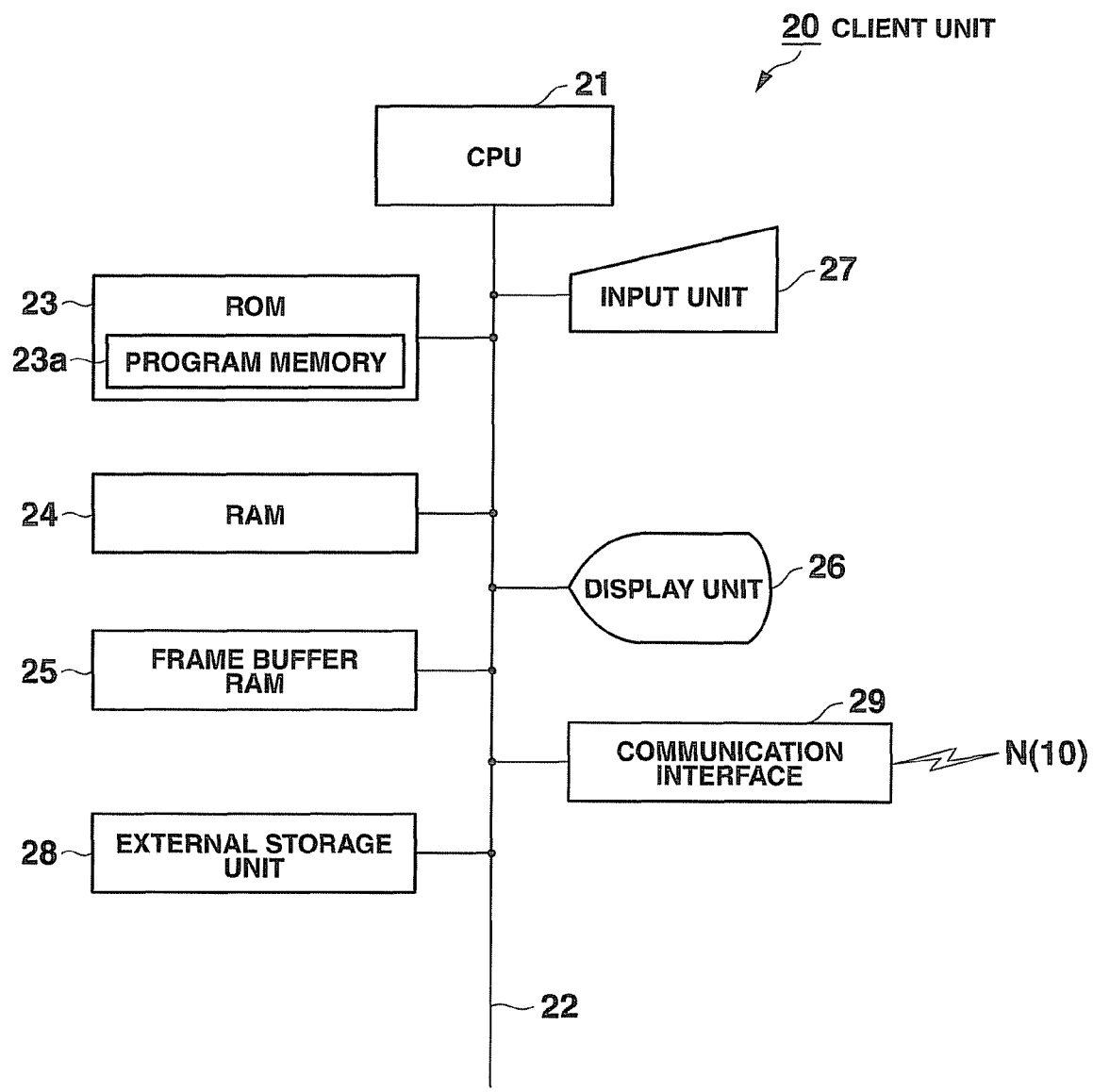
FIG. 3 is a block diagram showing a circuit configuration of a client unit 20 in the SBC system.

FIG. 3 is a block diagram showing a circuit configuration of the client unit 20 in the SBC system.

The client unit 20 includes a CPU 21 serving as a computer. A ROM 23, a RAM 24, and a frame buffer RAM 25 are connected to the CPU 21 via a bus 22. The drawing data G written in the frame buffer RAM 25 is displayed on the screen of the display unit 26.

Further connected to the CPU 21 via the bus 22 are an input unit 27, an external storage unit 28, and a communication interface 29 for communicating with the server unit 10.

The CPU 21 controls the operation of each part of the circuit using the RAM 24 as a working memory according to a system program prestored in a program memory 23a of the ROM 23. According to, for example, a key input signal from the input unit 27, an application response signal from the server unit 10 received via the communication interface 29, transferred drawing data G, or the like, the CPU 21 activates and executes the system program.

In the client unit 20, the various items of data created as a result of the execution of the application program in the server unit 10 are stored suitably into the external storage unit 28. In addition, the transferred display drawing data G is developed on the frame buffer RAM 25. The developed data is then displayed on the display unit 26.

Figure 4:
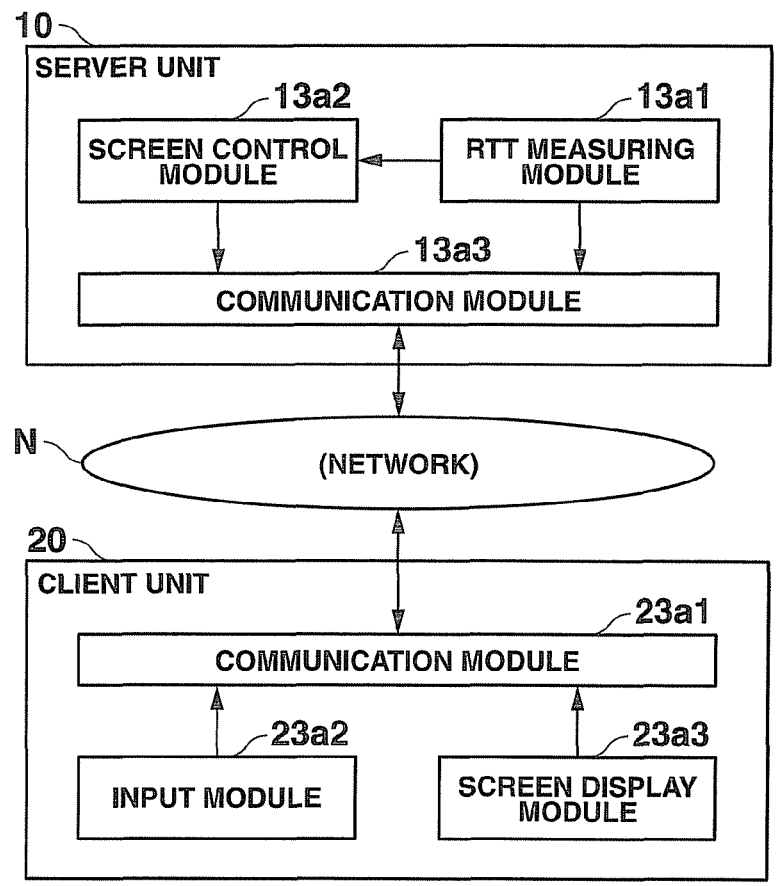
FIG. 4 shows the configuration of a software module in each of the server unit 10 and client unit 20.

FIG. 4 shows the configuration of a software module in each of the server unit 10 and client unit 20.

A server control program stored in the program memory 13a of the server unit 10 includes a round-trip time (RTT) measuring module 13a1, a screen control module 13a2, and a communication module 13a3.

The RTT measuring module 13a1 has the function of measuring the degree of a delay in the transmission between the server unit 10 and the client unit 20 in the network N and informing the screen control module 13a2 of the measurement result.

The screen control module 13a2 has the function of activating an application program corresponding to the input event from the client unit 20, creating display drawing data G on the client frame buffer RAM 14a, and controlling a transmission schedule for the drawing data G to the client unit 20 according to the result of measuring the transmission delay informed by the RTT measuring module 13a1.

The communication module 13a3 has the function of handing over the input event data or data for RTT measurement received from the client unit 20 to the screen control module 13a2 or RTT measuring module 13a1 and the function of transmitting the data for RTT measurement received from the RTT measuring module 13*a* or the drawing data G received from the screen control module 13*a*2 to the client unit 20.

The client control program stored in the program memory 23*a* of the client unit 20 includes a communication module 23*a*1, an input module 23*a*2, and a screen display module 23*a*3.

The communication module 23*a*1 has the function of transmitting and receiving data for RTT measurement to and from the server unit 10 and the function of transmitting the input event data received from the input module 23*a*2 to the server unit 10 and handing over the display drawing data G received from the server unit 10 to the screen display module 23*a*3.

The input module 23*a*2 has the function of handing over the input event data corresponding to the user operation to the communication module 23*a*1.

The screen display module 23*a*3 has the function of developing the display drawing data G received from the communication module 23*a*1 on the frame buffer RAM 25 and causing the display unit 26 to display the data G.

Figure 5:
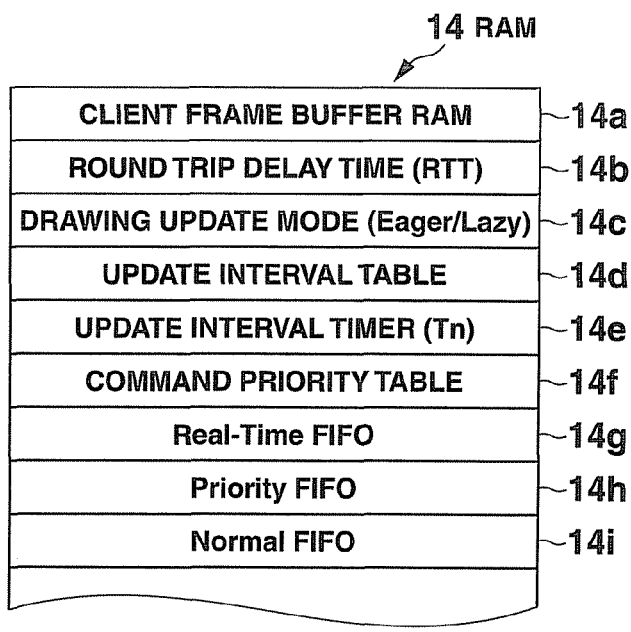
FIG. 5 shows primary data memories prepared in a RAM 14 of the server unit 10.

FIG. 5 shows primary data memories prepared in the RAM 14 of the server unit 10.

Prepared in the RAM 14 are not only the client frame buffer RAM 14*a* but also an RTT memory 14*b*, a drawing update mode memory 14*c*, an update interval table memory 14*d*, an update interval timer memory 14*e*, a command priority table memory 14*f*, a Real-time FIFO memory 14*g*, a Priority FIFO memory 14*h*, a Normal FIFO memory 14*i*, and others.

The RTT memory 14*b* stores a transmission delay time t between the server unit 10 and the client unit 20 measured by the RTT measurement function of the RTT measuring module 13*a*1.

FIG. 6 shows the sequence of an RTT measurement process by the RTT measuring module 13*a*1 of the server unit 10.

FIG. 7 shows a format of an RTT measurement request transmitted to the client unit 20 as a result of an RTT measurement process by server unit 10.

First, the server unit 10 transmits an RTT measurement request to the client unit 20 at regular intervals (P1).

As shown in FIG. 7, the format of the RTT measurement request includes the command number, data size, measurement number, the number of transmitted data items (in bytes) for upload measurement, its number of divisions, the number of data items (in bytes) for download measurement, and its number of divisions.

When having received an RTT measurement request transmitted from the server unit 10, the client unit 20 transmits an upload RTT measurement packet to the server unit 10 according to the number of transmitted data items (bytes) for upload measurement and its number of divisions set in the format (P2).

When having received the upload RTT measurement packet transmitted from the client unit 20, the server unit 10 transmits a download RTT measurement packet to the client unit 20 according to the number of transmitted data items (in bytes) for download measurement and its number of divisions set in the format (P3).

When having received the download RTT measurement packet transmitted from the server unit 10, the client unit 20 determines the difference between a time stamp at the time of transmitting the upload RTT measurement packet and that at the time of receiving the download RTT measurement packet to be a transmission delay time t and informs the server unit 10 of the transmission delay time t (P4).

The transmission delay time t notified to the server unit 10 is not only handed over to the RTT measuring module 13*a*1 and stored into the RTT memory 14*b* but also handed over to the screen control module 13*a*2.

On the basis of the transmission delay time t between the server unit 10 and the client unit 20 stored in the RTT memory 14*b*, the screen control module 13*a*2 sets a transmission schedule for the drawing data G for client screen update in either the Instantaneous (Eager) Update mode or Non-instantaneous (Lazy) Update mode.

Figure 8:
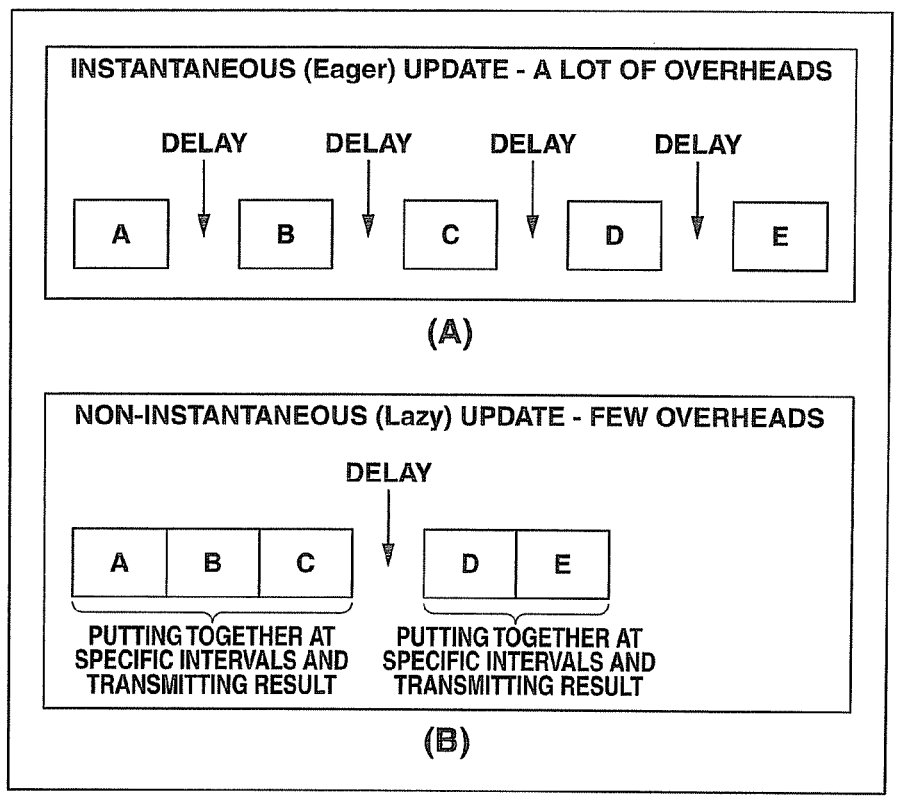
FIG. 8 is a diagram to explain a screen transmission schedule in an Instantaneous (Eager) Update mode and that in a Non-instantaneous (Lazy) Update mode set according to a transmission delay time t obtained by the RTT measuring module 13a1 of the server unit 10 by comparing these schedules.

FIG. 8 is a diagram to explain a screen transmission schedule in the Instantaneous (Eager) Update mode and that in the Non-instantaneous (Lazy) Update mode set according to the transmission delay time t obtained by the RTT measuring module 13*a*1 of the server unit 10 by comparing these schedules.

Scheduling methods of causing the server unit 10 to transmit a screen generally include the following two:

(1) A method of transmitting the drawing data G in real time with the timing with which an application issues a drawing instruction (Instantaneous (Eager) Update mode: see (A) in FIG. 8)

(2) A method of allowing a specific interval of time, putting together the drawing data items G during the interval on the expiration of the specific interval of time, and transmitting the resulting data (Non-instantaneous (Lazy) Update mode: see (B) in FIG. 8)

As shown by (A) in FIG. 8, it is desirable that the transmission schedule for drawing data G for client screen update should be in the Instantaneous (Eager) Update mode in which the waiting time is shorter and drawing commands are transmitted in the order of generation. However, if a small transmission is repeated many times in an environment with a large transmission delay, transmission overhead takes places many times. Accordingly, in an environment with a large transmission delay, the Non-instantaneous (Lazy) Update mode is desirable to decrease the number of packets as shown by (B) in FIG. 8.

In the drawing update mode memory 14*c* of the RAM 14, data indicating the Instantaneous (Eager) Update mode is stored if the transmission delay time t successively updated and stored in the RTT memory 14*b* is equal to or shorter than a preset threshold value TH and data indicating the Non-instantaneous (Lazy) Update mode is stored if the transmission delay time t has exceeded the threshold value TH.

As described above, a method of allowing the specific interval of time, putting together the drawing commands during the interval on the expiration of the time of the timer, and transmitting the resulting commands is used in the Non-instantaneous (Lazy) Update mode. However, if the specific timer interval is too long, the drawing and update response of the user to an input event (e.g., a keyboard or mouse input) becomes worse. If the specific timer interval is made shorter, transmission overhead increases as in the Instantaneous (Eager) Update mode. Accordingly, the server unit 10 of the embodiment controls the timer interval in multiple stages.

Figure 9:
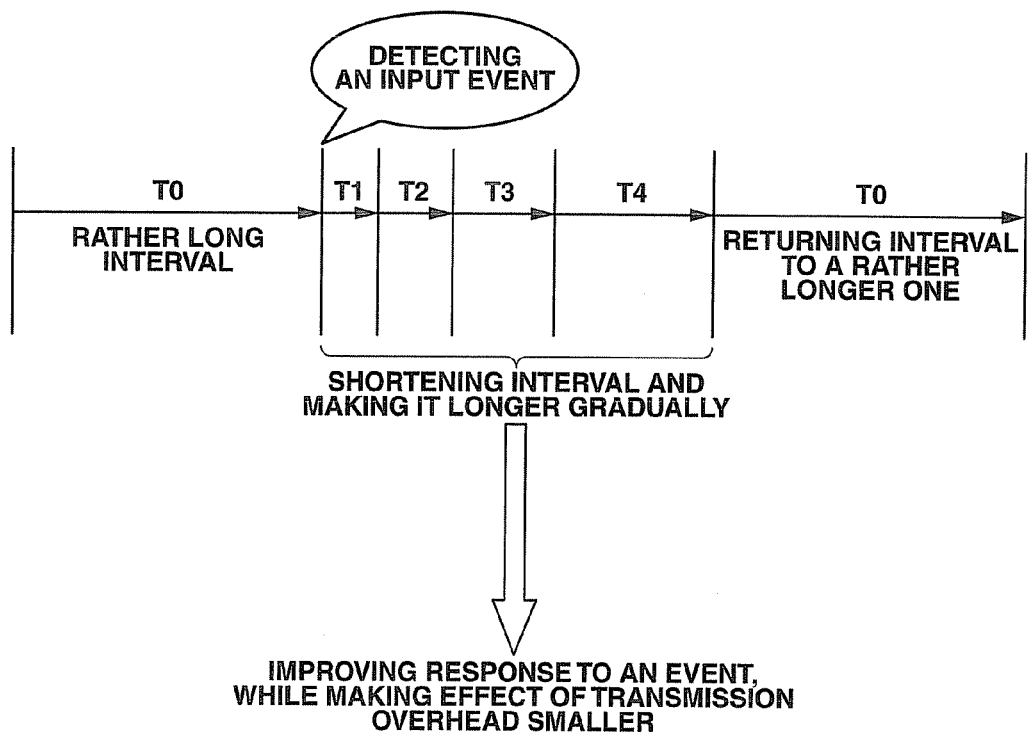
FIG. 9 is a pictorial diagram showing multistage control of a drawing update timer interval in the Non-instantaneous (Lazy) Update mode at the server unit 10.

FIG. 9 is a pictorial diagram showing multistage control at drawing update timer intervals in the Non-instantaneous (Lazy) Update mode at the server unit 10.

FIG. 10 is an update interval table for setting a drawing update time interval in multiple stages in the Non-instantaneous (Lazy) Update mode at the server unit 10.

Specifically, immediately after an input event according to the user operation has been received from the client unit 20, a transmission interval is set rather short (drawing update time interval T1=5 ms). Thereafter, the interval is made longer gradually from T2 (15 ms) to T4 (25 ms) and returned to a default value T0 (30 ms). By doing this, immediately after the user has issued an input event, the screen has a good response and is updated early. Thereafter, a transmission overhead can be avoided at regular intervals corresponding to the transmission delay.

The update interval table memory 14d of the RAM 14 stores the update interval table shown in FIG. 10.

In the update interval timer memory 14e of the RAM 14, a drawing update timer interval Tn is set according to the update interval table stored in the table memory 14d, thereby controlling the timing of transmitting the drawing data G and updating the drawing.

In the Non-instantaneous (Lazy) Update mode, when a specific interval of time is allowed, a plurality of drawing data items G updated during the specific interval are put together on the expiration of the drawing update timer interval Tn set in the timer memory 14e, and the resulting data items are transmitted, the areas where the drawing data items G overlap with one another are merged and only the latest ones are transmitted.

Furthermore, in the Non-instantaneous (Lazy) Update mode, when a plurality of updated drawing data items G are put together and then transmitted, the order of priority (high, medium, low) according to the type of a drawing command in each of the drawing data items G is determined. Then, the resulting drawing data G is transmitted using a FIFO memory (Real-time FIFO [high], Priority FIFO [medium], and Normal FIFO [low]) prepared according to the determined order of priority.

The order of priority (high, medium, low) of a drawing command in the Non-instantaneous (Lazy) Update mode is determined in ascending order of data size, or in the order of high→medium→low. That is, in the screen transfer system, data whose data size is smaller is transmitted earlier on the assumption that the smaller the data size, the shorter the processing time. Generally, in the graphical user interface (GUI) of a computer system, a command whose data size is smaller can be said to attract a higher degree of attention from the user. For example, the data size of the painted-over background of a font or a window is smaller than that of image data. In the case of a Web site, what the user wants to focus on is the basic configuration, including the background and text, not a banner or an advertising image. Accordingly, even if the transmission delay is large, contents which attract a higher degree of attention from the user are caused to be shown earlier.

FIG. 11 is a command priority table for setting an order of priority on a drawing command in the Non-instantaneous (Lazy) Update mode at the server unit 10.

The command priority table is stored in the command priority table memory 14f of the RAM 14.

Figure 12:
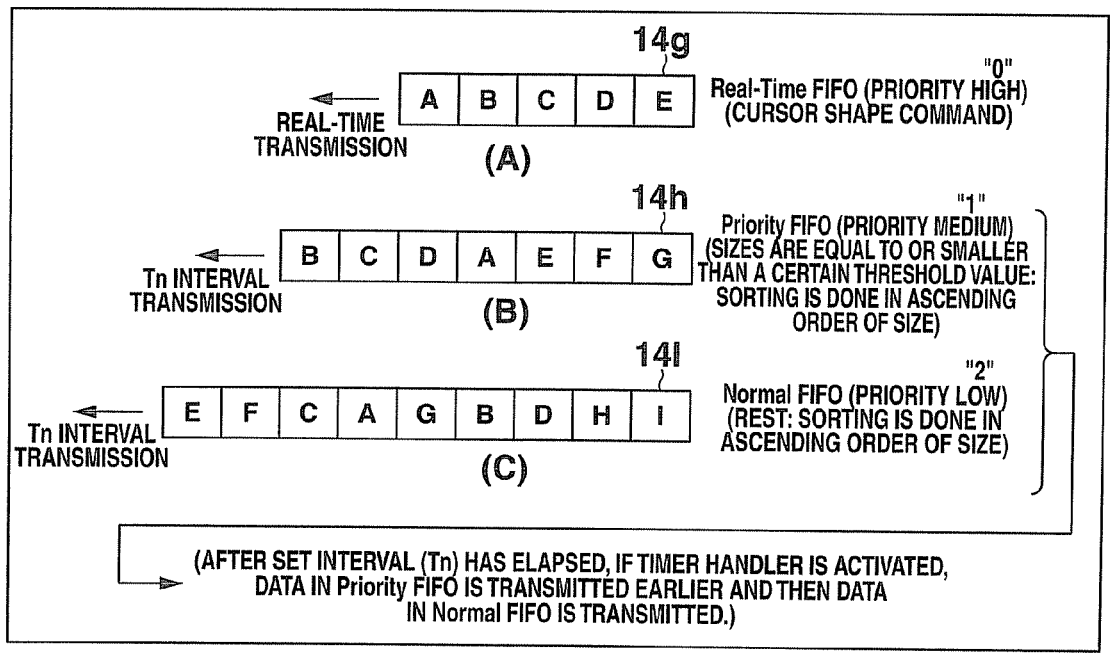
FIG. 12 shows a state where a drawing command is stored in each of a Real-time FIFO memory 14g, Priority FIFO memory 14h, and Normal FIFO memory 14i prepared in the RAM 14 of the server unit 10.

FIG. 12 shows a state where a drawing command is stored in each of Real-time FIFO memory 14g, Priority FIFO memory 14h, and Normal FIFO memory 14i prepared in the RAM 14 of the server unit 10.

Specifically, if a drawing command for the screen drawing data G created by an application program corresponding to the input event from the client unit 20 is, for example, a drawing command for "Cursor," the drawing command is set to a priority flag "high" (0) and stored in the Real-time FIFO memory 14g. In addition, if the drawing command for drawing data G is, for example, a drawing command for "simple color" (SFILL) or "Font," the drawing command is set to a priority flag "medium" (1) and stored in the Priority FIFO memory 14h. Moreover, if the drawing command for drawing data G is, for example, a drawing command for "Image" or "single pattern" (PFILL), the drawing command is set to a priority flag "low" (2) and stored in the Normal FIFO memory 14i.

Even if a drawing command with the priority flag "high" (0) stored in the Real-time FIFO memory 14g is in the Non-instantaneous (Lazy) Update mode, it is transmitted sequentially in real time with the timing that its drawing data G is created.

Each of a drawing command with the priority flag "medium" (1) stored in the Priority FIFO memory 14h and a drawing command with the priority flag "low" (2) stored in the Normal FIFO memory 14i is sorted and stored in ascending order of size by a "shortest job scheduling" method of minimizing the average response time. On the expiration of the drawing update timer interval Tn set in the update interval timer memory 14e, the data in the Priority FIFO memory 14h and the data in the Normal FIFO memory 14i are transmitted in that order.

In FIG. 12, data items A, B, C, . . . stored in the FIFO memories 14g, 14h, 14i, respectively, represent the order in which data items A, B, C, . . . were created.

Figure 13:
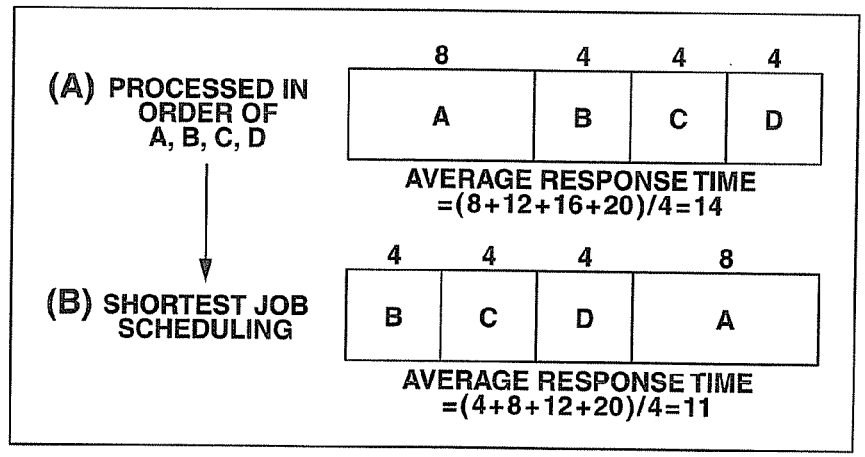
FIG. 13 is a diagram to explain the shortest job scheduling in a screen transfer system.

FIG. 13 is a diagram to explain the shortest job scheduling in the screen transfer system.

For example, if the four data items A (size "8"), B (size "4"), C (size "4"), and D (size "4") sequentially created are processed in the order of data items A, B, C, and D as shown by (A) in FIG. 13, the average response time per data item is "14." In contrast, if the four data items A, B, C, and D are processed in ascending order of size by the shortest jog scheduling, that is, in the order of B, C, D, and A, the average response time per data item is decreased to "11."

Accordingly, the drawing command for the screen drawing data G determines the order of priority (high, medium, and low) according to the data size, allocates the data item to the corresponding FIFO memory (Real-time FIFO "high" memory 14g, Priority FIFO "medium" memory 14h, or Normal FIFO "low" memory 14i), and transmits the data item sequentially in real time or at intervals of time corresponding to the drawing update timer interval Tn. Moreover, a drawing command stored in each of the Priority FIFO "medium" memory 14h and the Normal FIFO "low" memory 14i is sequentially transmitted at the intervals of time, while being sorted in ascending order of size according to the shortest job scheduling to minimize the average response time.

Therefore, even in an environment where the transmission delay is large, such content as text or background attracting a high degree of attention from the user can be transmitted earlier, which enables the apparent responsiveness to be improved.

Next, the screen drawing data update function of the server unit 10 in the SBC system configured as described above will be explained.

Figure 14:
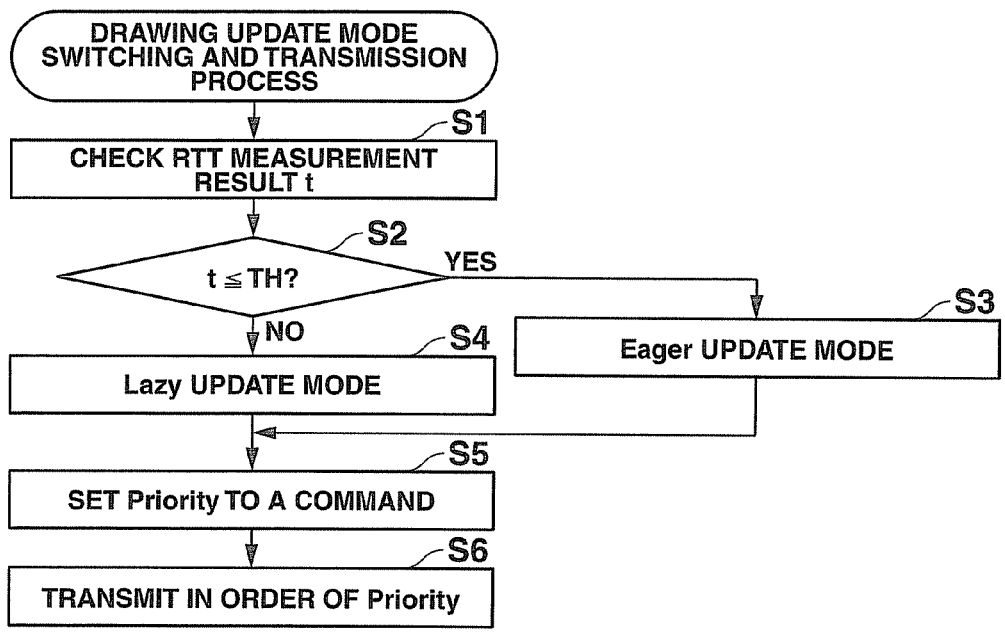
FIG. 14 is a flowchart for a drawing update mode switching and transmission process by the server unit 10.

FIG. 14 is a flowchart for a drawing update mode switching and transmission process by the server unit 10.

In the server unit 10, when the screen drawing data G is created on the client frame buffer RAM 14a as a result of the execution of the application program corresponding to the input event from the client unit 20, the RTT measuring module 13a1 (see FIG. 4) reads the latest transmission delay time t measured as shown in FIG. 6 and stored in the RTT memory 14b (step S1) and determines whether the transmission delay time t is equal to or shorter than the preset threshold value TH (step S2).

If it has been determined that the latest transmission delay time t is equal to or shorter than the preset threshold value TH (YES in step S2), a transmission schedule for drawing data G for client screen update is set in the Instantaneous (Eager) Update mode, which is then stored in the drawing update mode memory 14c (step S3).

If it has been determined that the latest transmission delay time t has exceeded the preset threshold value TH (NO in step S2), a transmission schedule for drawing data G for client screen update is set in the Non-instantaneous (Lazy) Update mode, which is then stored in the drawing update mode memory 14c (step S4).

Here, if the transmission delay time t is equal to or shorter than the threshold value TH (YES in step S2) and the transmission schedule has been set in the Instantaneous (Eager) Update mode (step S3), the order of priority of the drawing command for the screen drawing data G created on the client frame buffer RAM 14a is set according to the command priority table (see FIG. 11) stored in the command priority table memory 14f (step S5). Then, the drawing commands for the screen drawing data items G are transmitted to the client unit 20 in the order of the set order of priority, thereby updating the drawing (step S6).

Figure 15:
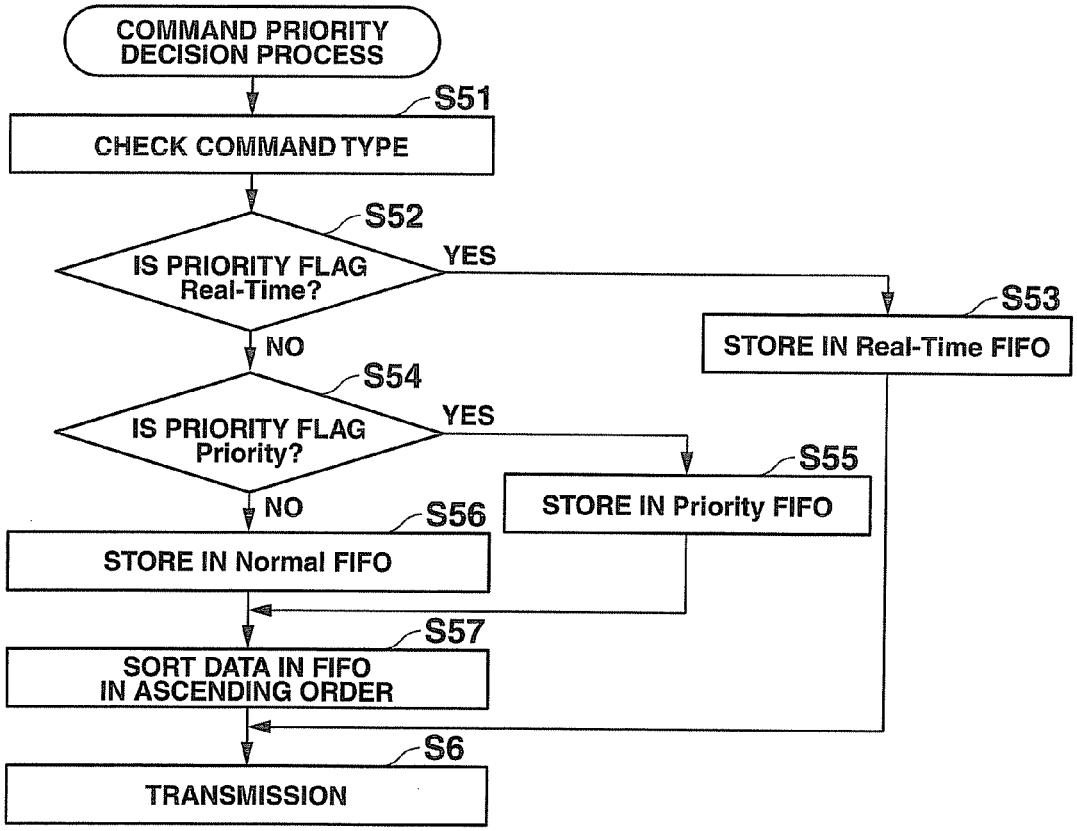
FIG. 15 is a flowchart for a command priority decision process in a state where the Non-instantaneous (Lazy) Update mode has been set as a result of the drawing update mode switching and transmission process by the server unit 10.

In contrast, if the transmission delay time t has exceeded the threshold value TH (NO in step S2) and therefore the transmission schedule has been set in the Non-instantaneous (Lazy) Update mode (step S4), the order of priority of the drawing command for the screen drawing data G created on the client frame buffer RAM 14a is determined according to the command type by the command priority decision process in FIG. 15 and stored in the Real-time FIFO memory 14g, Priority FIFO memory 14h, or Normal FIFO memory 14i (step S5). Then, by a drawing update interval setting process in FIG. 16, a drawing update timer interval Tn which is short at the beginning and becomes longer gradually is set. With the timing corresponding to the set drawing update timer interval Tn, the data for each of the commands stored in the Priority FIFO memory 14h and Normal FIFO memory 14i is transmitted sequentially to the client unit 20 (step S6).

Here, the drawing command for the screen drawing data G stored in the Real-time FIFO memory 14g is transmitted in real time, regardless of the drawing update timer interval Tn.

FIG. 15 is a flowchart for a command priority decision process in a state where the Non-instantaneous (Lazy) Update mode has been set as a result of the drawing update mode switching and transmission process by the server unit 10.

In the command priority decision process, the drawing command for the screen drawing data G created on the client frame buffer RAM 14a is checked for command type (step S51). According to the command priority table (see FIG. 11) stored in the command priority table memory 14f, it is determined whether the command is set to the priority flag "0" (high) (Yes in step S52), to the priority flag "1" (medium) (Yes in step S54), or to the priority flag "2" (low) (No in step S54).

Here, a drawing command determined to be set to the priority flag "0" (high) (Yes in step S52) is stored in the Real-time FIFO memory 14g as shown by (A) in FIG. 12 (step S53) and is transmitted in real time to the client unit 20 in the order in which it is stored (step S6).

In contrast, a drawing command determined to be set to the priority flag "1" (medium) (Yes in step S54) is stored in the Priority FIFO memory 14h as shown by (B) in FIG. 12 (step S55). Moreover, a drawing command determined to be set to the priority flag "2" (low) (No in step S54) is stored in the Normal FIFO memory 14i as shown by (C) in FIG. 12 (step S56).

Each of a drawing command with the priority flag "1" (medium) stored in the Priority FIFO memory 14h and a drawing command with the priority flag "2" (low) stored in the Normal FIFO memory 14i is sorted and stored in ascending order of size according to the shortest job scheduling (step S57). With the timing corresponding to the drawing update timer interval Tn set according to the drawing update interval setting process of FIG. 16, the commands are transmitted in the order of priority to the client unit 20 (step S6).

Figure 16:
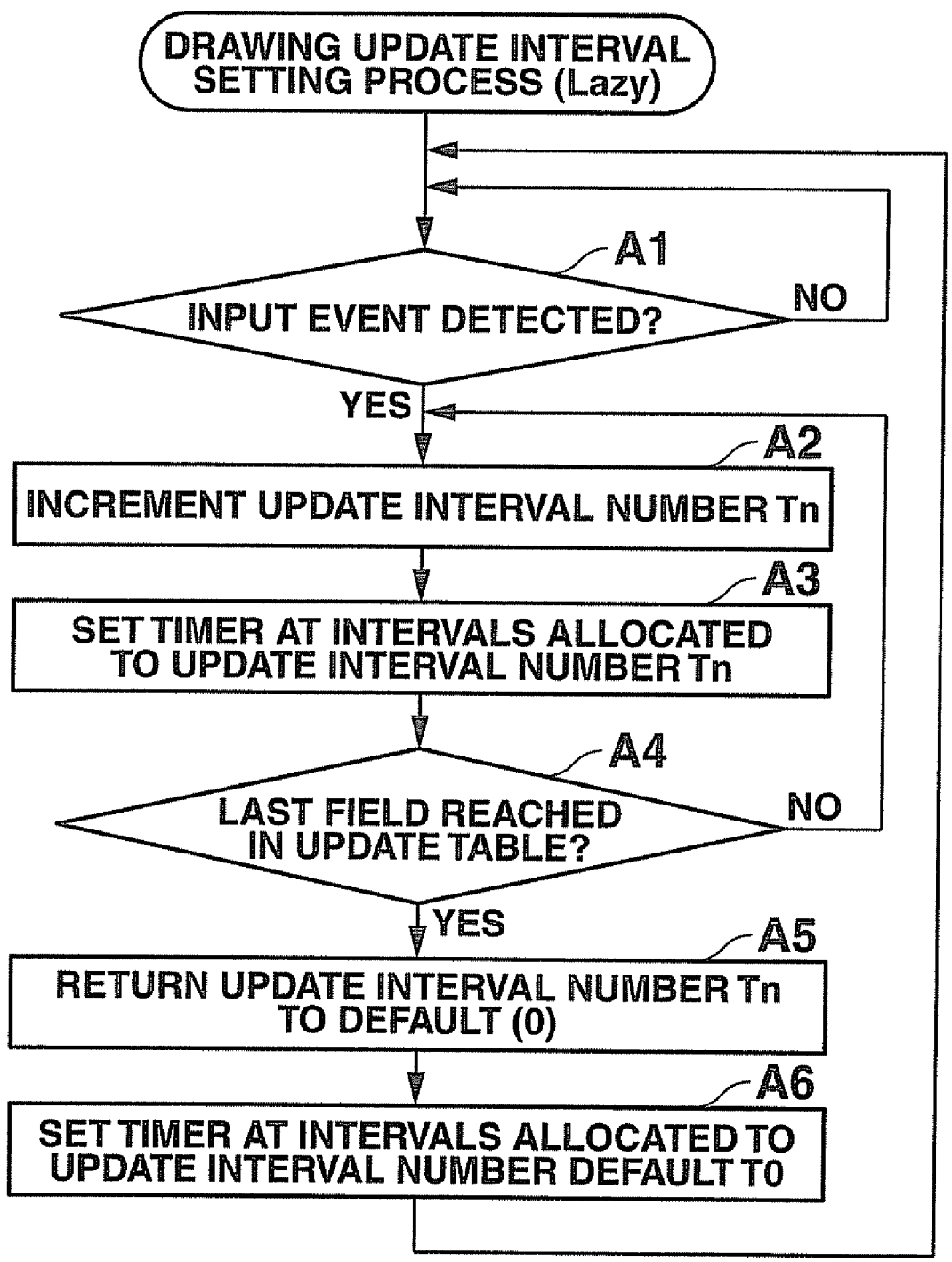
FIG. 16 is a flowchart for a drawing update interval setting process in a state where the Non-instantaneous (Lazy) Update mode has been set as a result of the drawing update mode switching and transmission process by the server unit 10.

FIG. 16 is a flowchart for a drawing update interval setting process in a state where the Non-instantaneous (Lazy) Update mode has been set as a result of the drawing update mode switching and transmission process by the server unit 10.

In the drawing update interval setting process, when the input event from the client unit 20 has been detected and screen drawing data G is created on the client frame buffer RAM 14a as a result of the execution of an application program corresponding to the input event (step A1), the update interval number (Tn) in the update interval table (see FIG. 10) stored in the update interval table memory 14d is incremented from the default value "0" to "1" (step A2). The shortest update interval (5 ms) caused to correspond to the update interval number (T1) is set in the update interval timer memory 14e (step A3).

Here, if the shortest update interval T1 (5 ms) set in the update interval timer memory 14e in step A3 has elapsed and time is up, it is determined whether the update interval number (Tn) currently set in the timer has reached the last update interval number "4" (step A4).

In this case, since it has been determined that the update interval number (T1) currently set in the timer has not reached the last update interval number "4" (No in step A4), the update interval number (T1) is further incremented to T2 in step A2 (step A2). The second shortest update interval (15 ms) caused to correspond to the update interval number (T2) is set in the update interval timer memory 14e (step A3).

Thereafter, the processes in steps A2 to A4 are repeated as described above, with the result that the update interval set in the update interval timer memory 14e becomes longer gradually in this order: T2 [15 ms]→T3 [20 ms]→T4 [25 ms].

Then, if it has been determined in step A4 that the update interval number (T4) currently set in the timer has reached the last update interval number "4" (Yes in step A4), the update interval number (Tn) is returned to the default value "0" (step A5). The rather long update interval (30 ms) caused to correspond to the update interval number (T0) is set in the update interval timer memory 14e (step A6).

By the drawing update interval setting process, the drawing update time interval (Tn) in the Non-instantaneous (Lazy) Update mode is set so as to be short at the beginning and get longer gradually in this order: T1 [5 ms]→T2 [15 ms]→T3 [20 ms]→T4 [25 ms]→T0 [30 ms]. The drawing command with the priority flag "1" (medium) stored in the Priority FIFO memory 14h and the drawing command with the priority flag "2" (low) stored in the Normal FIFO memory 14i are transmitted in the order of priority to the client unit 20 with the timing corresponding to the drawing update timer interval Tn (step S6).

Accordingly, with the screen drawing data update function of the server unit 10 in the SBC system configured as described above, when a drawing command for the screen drawing data G created on the client frame buffer RAM 14a as a result of the execution of an application program corresponding to the use event from the client unit 20 is transmitted to the client unit 20, if the transmission delay time t between the client unit 20 and the server unit 10 measured by the RTT measuring module 13a1 is within the preset threshold value TH, the Instantaneous (Eager) Update mode is set in which the drawing command is transmitted in real time in the order in which the screen drawing data G correspond to the input event was created. If the transmission delay time t has exceeded the preset threshold value TH, the Non-instantaneous (Lazy) Update mode is set in which an interval corresponding to the drawing update timer interval Tn is allowed, drawing commands are put together during the interval, and the resulting commands are transmitted.

Then, in the Non-instantaneous (Lazy) Update mode, transmission priority according to the type of a drawing command (the user's attention) is set. Moreover, drawing commands of the same order of priority are sorted in ascending order of data size and the drawing update timer interval Tn is controlled in multiple stages so as to be short at the beginning and become longer gradually, thereby transmitting the drawing commands in the order of transmission priority.

Accordingly, even in an environment where the transmission delay is large, such content as text or background attracting a high degree of attention from the user can be transmitted earlier, which enables the apparent responsiveness to be improved.

The methods of the individual processes by the server unit 10 in the SBC system written in the embodiment, including the drawing update mode switching and transmission process shown in the flowchart of FIG. 14, the command priority decision process involved in the drawing update mode switching and transmission process shown in the flowchart of FIG. 15, and the drawing update interval setting process involved in the drawing update mode switching and transmission process shown in the flowchart of FIG. 16, can be stored in a recording medium of the external storage unit 18, such as a memory card (e.g., a ROM card or a RAM card), a magnetic disk (e.g., a floppy disk or a hard disk), an optical disk (e.g., a CD-ROM or a DVD), or a semiconductor memory, in the form of programs the computer can execute. Accordingly, the processes by the server unit 10 in the SBC system written in the embodiment, including the drawing update mode switching and transmission process shown in the flowchart of FIG. 14, the command priority decision process involved in the drawing update mode switching and transmission process shown in the flowchart of FIG. 15, and the drawing update interval setting process involved in the drawing update mode switching and transmission process shown in the flowchart of FIG. 16, are implemented as a sequence of computer implemented modules. Then, the mediums can be delivered. The computer (CPU 11) of the server unit 10 loads the program stored in the recording medium of the external storage unit 18 into the storage unit (flash ROM 13 or RAM 14). The computer is controlled by the read-in program, thereby realizing the screen drawing data update function explained in the embodiment, which enables the same processes in the aforementioned methods to be carried out.

Furthermore, the data of the programs which realize the above methods can be transferred in the form of program code through a communication network (N). The program data can be loaded from a computer unit (or a program server) connected to the communication network (N) into the storage unit (flash ROM 13 or RAM 14), thereby realizing the screen drawing data update function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server unit which creates drawing data according to an application program corresponding to an input event from a client unit via a network and transmits the drawing data to the client unit to cause the client unit to display the data in a server-based computing system, the server unit comprising:
 a processor coupled to a memory, the memory stores instructions that are executed by the processor;
 a transmission delay measuring module which measures a transmission delay time in the network;
 a first drawing instruction transmission module which, when the transmission delay time in the network measured by the transmission delay measuring module is small, transmits a drawing instruction for the drawing data in real time to the client unit in the order in which the drawing data was created; and
 a second drawing instruction transmission module which, when the transmission delay time in the network measured by the transmission delay measuring module is large, sets a drawing update interval that is short at the beginning and becomes longer gradually and transmits a drawing instruction for the created drawing data to the client unit in the order of the transmission priority of the drawing instruction in accordance with the set update interval, wherein the transmission priority of the drawing instruction is set on the basis of a priority table where a different order of priority has been determined according to the type of the drawing instruction, and wherein the drawing update intervals at which drawing instructions are transmitted by the second drawing instruction transmission module are set on the basis of an update interval table where multistage update intervals have been determined.

2. The server unit according to claim 1, wherein, of the drawing instructions transmitted in the order of transmission priority by the second drawing instruction transmission module, those of the same priority are sorted in ascending order of data size and then transmitted.

3. The server unit according to any one of claim 1 claim or 3, wherein transmission delay measuring module measures a transmission delay time between the module and the client unit in cooperation with the client unit.

4. A non-transitory computer-readable recording medium which records, in the form of a program, the process of creating drawing data according to an application program corresponding to an input event from a client unit via a network and transmitting the data to the client unit to cause the client unit to display the data and from which a computer of a server unit in a server-based computing (SBC) system is capable of reading instructions, the program comprising:
 a process of measuring a transmission delay time in the network;
 a process of, when the measured transmission delay time in the network is short, transmitting a drawing instruction for the drawing data in real time to the client unit in the order in which the drawing data was created; and
 a process of, when the measured transmission delay time in the network is long, setting a drawing update interval that is short at the beginning and becomes longer gradually and transmitting a drawing instruction for the created drawing data to the client unit in the order of the transmission priority of the drawing instruction in accordance with the set update interval, wherein the drawing update intervals at which drawing instructions are transmitted by the second drawing instruction transmission module are set on the basis of an update interval table where multistage update intervals have been determined, wherein the transmission priority of the drawing instruction is set on the basis of a priority table where a different order of priority has been determined according to the type of the drawing instruction.

5. A server control method of controlling a computer of a server unit in a server-based computing system which creates drawing data according to an application program corresponding to an input event from a client unit via a network and transmits the drawing data to the client unit to cause the client unit to display the data, the server control method comprising:

a process of measuring a transmission delay time in the network; a process of, when the measured transmission delay time in the network is short, transmitting a drawing instruction for the drawing data in real time to the client unit in the order in which the drawing data was created; and a process of, when the measured transmission delay time in the network is long, setting a drawing update interval that is short at the beginning and becomes longer gradually and transmitting a drawing instruction for the created drawing data to the client unit in the order of the transmission priority of the drawing instruction in accordance with the set update interval, wherein the drawing update intervals at which drawing instructions are transmitted by the second drawing instruction transmission module are set on the basis of an update interval table where multistage update intervals have been determined, wherein the transmission priority of the drawing instruction is set on the basis of a priority table where a different order of priority has been determined according to the type of the drawing instruction.

* * * * *